United States Patent [19]

Oka

[11] Patent Number: 5,632,494
[45] Date of Patent: May 27, 1997

[54] SEAL RING AND SEAL DEVICE

[75] Inventor: Toshio Oka, Kashiwazaki, Japan

[73] Assignee: Kabushiki Kaisha Riken, Tokyo, Japan

[21] Appl. No.: 531,639

[22] Filed: Sep. 21, 1995

[30] Foreign Application Priority Data

Feb. 16, 1995 [JP] Japan .................. 7-050348

[51] Int. Cl.⁶ ........................................... F16J 15/40
[52] U.S. Cl. ............... 277/59; 277/27; 277/58; 277/165; 277/177
[58] Field of Search .................. 277/58, 59, 71, 277/27, 165, 173, 177, 216, 217, 31, 63, 168, 169, DIG. 8; 192/85 AA

[56] References Cited

U.S. PATENT DOCUMENTS

| | | | |
|---|---|---|---|
| 3,727,927 | 4/1973 | Packard | 277/173 |
| 3,887,198 | 6/1975 | McClure et al. | 277/27 |
| 3,895,815 | 7/1975 | Panigati | 277/171 |
| 4,165,079 | 8/1979 | Clements | 277/27 |
| 4,299,401 | 11/1981 | McCormick | 277/216 |
| 4,350,352 | 9/1982 | Kolarik | 277/216 |
| 4,497,494 | 2/1985 | Allen et al. | 277/165 |
| 4,633,907 | 1/1987 | Adams | 277/177 |
| 4,681,326 | 7/1987 | Kubo | 277/27 |
| 4,934,250 | 6/1990 | Siegel | 91/378 |
| 5,136,781 | 8/1992 | Stoll | 29/888.3 |

FOREIGN PATENT DOCUMENTS

| | | |
|---|---|---|
| 2 217 607 A | 9/1974 | France . |
| 2 658 261 A | 8/1991 | France . |
| 3 805 735 A1 | 9/1989 | Germany . |

*Primary Examiner*—Daniel G. DePumpo
*Attorney, Agent, or Firm*—Kubovcik & Kubovcik

[57] ABSTRACT

A seal ring fitted into ring grooves provided in the outer peripheral surface of a shaft has side surfaces and an inner circumferential surface which receive hydraulic pressure supplied to the ring groove. The side surfaces of the seal ring are made tapered surfaces so that the width of the seal ring on its inner circumferential side is made smaller than the width of the seal ring on its outer circumferential side. The seal ring has an outer circumferential surface which is arcuate in form. Hydraulic pressure which acts upon one side surface of the seal ring causes the other side surface of the seal ring to come into sliding contact with the side wall surface of the ring groove. As a result, loss torque due to sliding contact is reduced. The tapered surfaces of the seal ring contact the edge of the side wall surface of the ring groove at all times so that there is no leakage of oil.

8 Claims, 6 Drawing Sheets

SEAL RING AND SEAL DEVICE

BACKGROUND OF THE INVENTION

1. Field of the Invention

This invention relates to a seal ring in which hydraulic pressure acts upon the side surface thereof, as well as to a seal device using this seal ring.

2. Description of the Prior Art

An automatic transmission employed in automotive vehicles has a hydraulic circuit which actuates clutches and brakes. A seal ring and seal device which prevent leakage of oil supplied to the hydraulic circuit are widely used. An example of a seal device using such a seal ring is illustrated in the sectional view of FIG. 5.

As shown in FIG. 5, a seal device indicated at numeral 1 has a hydraulic passageway 3 formed in a shaft 2, a pair of ring grooves 4 provided in the outer circumferential surface of the shaft 2, and seal rings 5, which are made of synthetic resin, fitted into the ring grooves 4. The peripheral surface of each seal ring 5 is brought into sliding contact with the inner peripheral surface of a rotary housing 6 on the drive side. The hydraulic passageway 3 communicates with a working chamber 9 inside the housing 6 via a groove 7 in the outer peripheral surface of the shaft 2 and an inlet 8 provided in the housing 6. A piston 10 delimits the working chamber 9 inside the housing 6. Hydraulic pressure within the working chamber 9 slides the piston 10 to the left in FIG. 5 so as to bring clutch plates 11 on the side of housing 6 and clutch plates 13 on the side of an output shaft 12 into sliding contact, thereby transmitting the rotating motion of the housing 6 to the output shaft 12. Cutting off the supply of hydraulic pressure to the working chamber 9 frees the clutches, thereby halting the transmission of rotating motion to the output shaft 12.

The groove 7 in the outer peripheral surface of the shaft 2 communicates with each of the ring grooves 4 so that hydraulic pressure that has been introduced to the ring grooves 4 brings the seal rings 5 into pressured contact with the side surfaces of the ring grooves 4 and brings the seal rings 5 into sliding contact with the inner peripheral surface of the housing 6, thereby preventing leakage of oil. In the example of FIG. 5, the forces which act upon the side surfaces of the seal rings 5 are larger than the forces which act upon the inner peripherals of the seal rings 5. As a result, the seal rings 5 are retained on the side of the shaft 2 and the outer peripheral surfaces of the seal rings 5 are brought into sliding contact with the housing 6. In this case, however, loss torque due to this sliding contact is large. Consequently, the outer circumferential surfaces of the seal rings 5 are held against the housing 6 and the side surfaces of the rings 5 are brought into sliding contact with the side wall surfaces of the ring grooves 4. An example of this is illustrated in FIG. 6.

As shown in FIG. 6, seal rings 5' each have circumferentially extending annular grooves 14 in both side surfaces thereof, and a plurality of spaced, diametrically extending grooves 15 which open to the annular grooves 14. Hydraulic pressure is introduced into the grooves 14, 15 so that each seal ring 5' is brought into sliding contact with one side wall of the respective ring groove 4 by a force P1 acting upon the side surface of the seal ring 5' and so that each seal ring 5' is held on the side of housing 6 by a force P2 acting upon the inner circumferential surface of the seal ring 5'.

In the example of FIG. 6, a sealed surface is assured over a width $l_1$ between the side surface of each seal ring 5' and the side wall surface of the corresponding ring groove 4. However, the width $l_1$ is small. Consequently, if the side wall surface of the ring groove 4 has been machined to have an incline (which is caused by the groove being machined at a low precision), the side wall surface wears eccentrically, the shaft 2 comes to be set off center and the rotating housing may wobble. If this occurs, the annular grooves 14 will open to the atmosphere and oil will leak out.

SUMMARY OF THE INVENTION

Accordingly, a first object of the present invention is to provide a seal ring which solves the aforementioned drawbacks encountered in the prior art.

A second object of the present invention is to provide a seal device which uses the seal ring mentioned above.

According to the present invention, the first object is attained by providing a seal ring fitted into each of a pair of spaced ring grooves provided in an outer peripheral surface of a shaft and having a side surface and an inner circumferential surface which receive hydraulic pressure supplied to each ring groove from a space between the ring grooves, wherein side surfaces of the seal ring are tapered such that the width of the seal ring on an inner circumferential side thereof is smaller than the width of the seal ring on an outer circumferential side thereof, the seal ring having an outer circumferential surface which is arcuate in form.

According to the present invention, the second object is attained by providing a seal device comprising a shaft having an annular groove which is provided in an outer surface thereof, and ring grooves each having side wall surfaces and communicating with the annular groove and provided on each side of the annular groove; a housing having an inner peripheral surface and a working chamber which communicates with the annular groove; seal rings, each of which each is made of synthetic resin and has side surfaces and an outer circumferential surface, arranged in each ring groove in such a manner that the outer circumferential surface comes into sliding contact with the inner peripheral surface of the housing and the side surface comes into sliding contact with the side wall surface of the ring groove; and a piston reciprocated by being acted upon by hydraulic pressure within the working chamber; the side surfaces of the seal ring being tapered such that the width of the seal ring on an inner circumferential side thereof is smaller than the width of the seal ring on an outer circumferential side thereof, the tapered surfaces having a taper angle of 2~10°, and the outer circumferential surface being an arcuate surface.

Preferably, the angle of inclination of the tapered surfaces of the seal ring is 2~10°, preferably 3~8° in view of dragging torque and amount of oil leakage. The arcuate surface of the seal ring is 2~50 R, preferably 20~40 R.

In operation, hydraulic pressure which acts upon one side surface of the seal ring causes the other side surface of the seal ring to come into sliding contact with the side wall surface of the ring groove. As a result, loss torque due to sliding contact is reduced. One of the tapered surfaces of the seal ring contacts the edge of the side wall surface of the ring groove at all times so that there is no leakage of oil ascribable to causes experienced in the prior art.

The seal device using this seal ring is such that hydraulic pressure within the working chamber inside the housing does not decline owing to leakage of oil. As a result, the piston inside the housing is reciprocated the required amount so that the brake and clutch can be operated correctly.

The arcuate outer circumferential surface of the seal ring is in contact with the inner peripheral surface of the housing at all times even if there is displacement between the axis of the shaft and the axis of the output shaft. The result is outstanding sealing capability.

In terms of its external shape, the sealing ring of the present invention resembles the keystone ring of an internal combustion engine. The keystone ring has a barrel-shaped outer circumferential surface. However, the keystone ring of an internal combustion engine undergoes reciprocation in the axial direction along with the piston as well as expanding and contracting motion in the diametric direction within the ring groove. In order to force out residual oil between the side surface of the keystone ring and the wall surface of the ring groove at the time of the expanding and contracting motion, the keystone ring adopted is such that the side surface of the piston ring is tapered. Accordingly, upon taking into consideration the taper angle of the tapered side surfaces of the keystone ring, it is required that the wall surfaces of the ring groove be furnished with a taper angle (the angle at which the wall surfaces of the ring groove taper toward the bottom of the groove) suitable for pushing out the oil residue.

Unlike this keystone ring for an internal combustion engine, the seal ring of the present invention is such that the required gap for introducing hydraulic pressure to the space between the seal ring and the side surfaces of the ring groove is assured at all times (even if the side surfaces of the ring groove are machined to maximum tolerance, e.g., even if the tapered side surfaces have an angle of inclination on the order of 0.5~1.0°). Since this gap is completely ineffective in pushing out the oil residue, the construction and action of the oil seal according to the invention differ from the construction and action of the keystone ring for an internal combustion engine.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the accompanying drawings.

Figure 1:
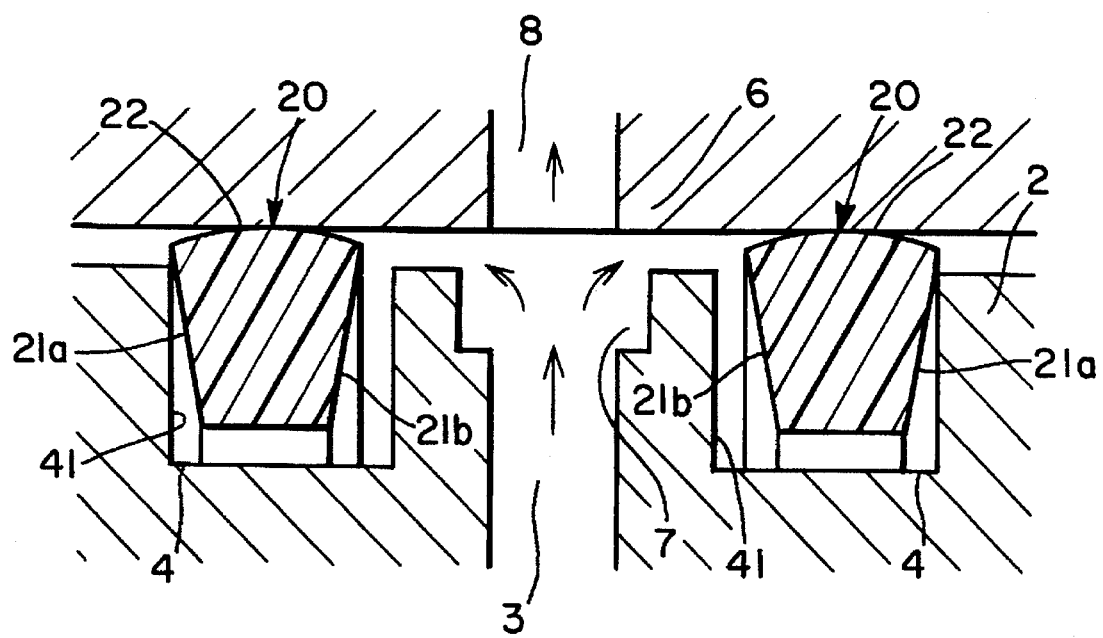
FIG. 1 is a sectional view illustrating an embodiment of a seal ring according to the present invention as well as a portion in which the ring is mounted.
Figure 5:
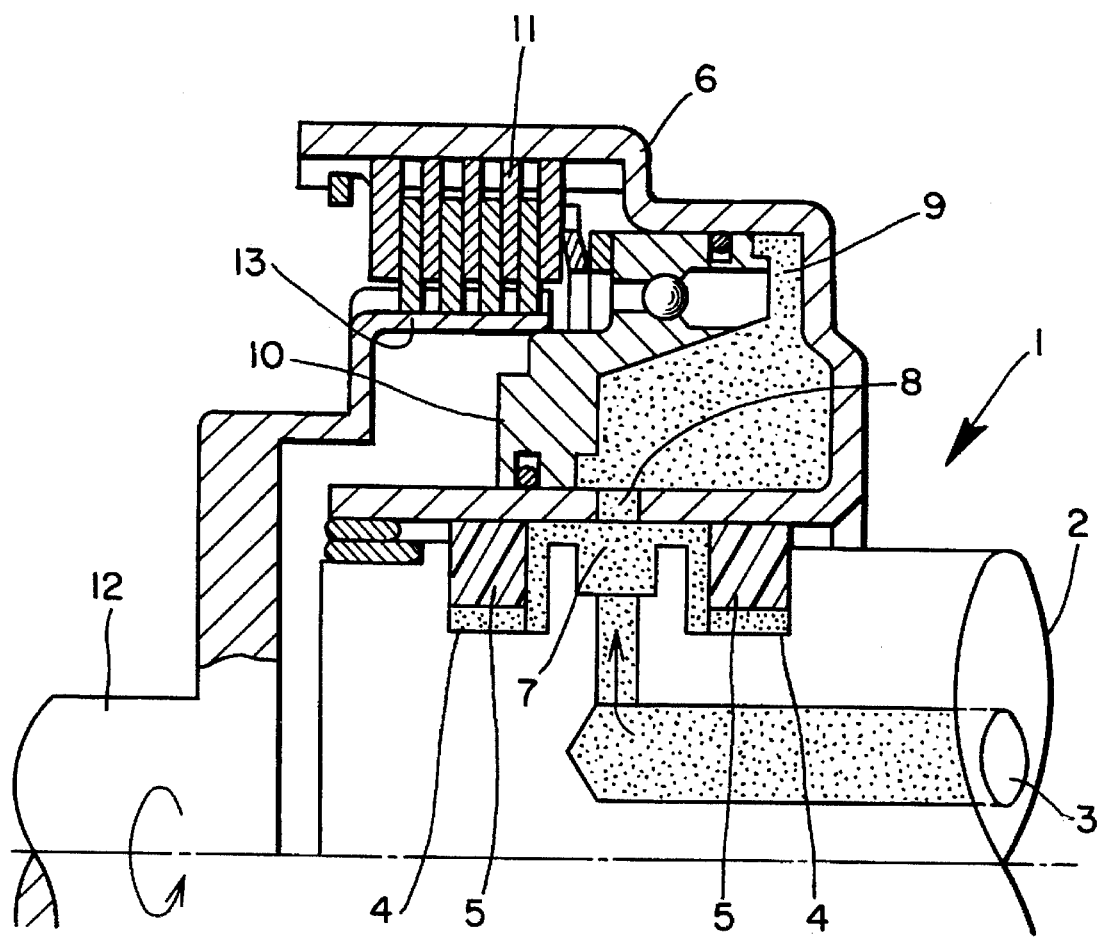
FIG. 5 is a sectional view showing an example of a sealing device according to the prior art wherein the above-mentioned seal ring is to be used.

FIG. 1 is a sectional view showing seal rings 20 according to an embodiment of the present invention. The seal device using the seal rings 20 has a construction identical with that shown in FIG. 5 and therefore only the portions that come into contact with the seal rings 20 are shown in FIG. 1; other portions are not shown.

The shaft 2 and housing 6 are made of steel (JIS S45C), and the seal rings 20 are made of a synthetic material having a high resistance to heat, such as polyether ether ketone (PEEK), polyphenylene sulfide (PPS) or polyimide, or cast iron.

Each seal ring 20 has tapered faces 21a, 21b on both its side surfaces so that the width of the ring is reduced on the inner circumferential side of the ring. The angle of inclination of the tapered faces is made 2~10°, preferably 5°. If the angle of inclination is less than 2°, hydraulic pressure cannot be introduced to the space between the tapered face 21a and the side wall 41 of the ring groove 4, the axially directed force from the tapered face 21b intensifies and torque loss between the side wall surface of the ring groove 4 and the tapered face 21a is enlarged. This is undesirable. If the angle of inclination is greater than 10°, the width of each seal ring 20 on the inner circumferential side thereof becomes too small, the sliding contact force on the inner peripheral surface of the housing 6 weakens and problems arise in terms of sealing performance.

The outer circumferential surface of each seal ring 20 defines an arcuate surface 22 having a radius of curvature of 2~20 mm R, preferably 20 mm R. The arcuate surface 22 is effective in that the surface 22 is brought into sliding contact with the inner peripheral surface of housing 6 at all time even if the housing 6 or shaft wobbles.

Hydraulic pressure introduced to the space between one tapered face 21a of the seal ring 20 and the side wall surface 41 of the ring groove 4 resists the hydraulic force that acts upon the other tapered face 21b of the seal ring 20, thereby reducing the loss torque between the tapered face 21a and the side wall face 41 of the ring groove 4 and assuring a good seal.

Figure 6:
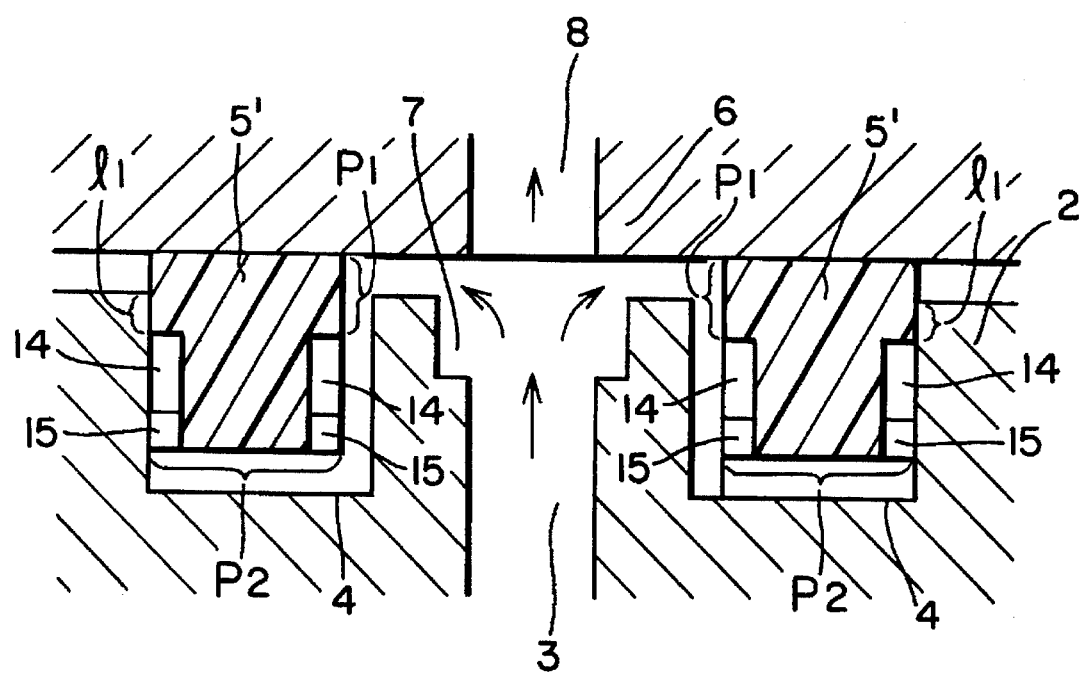
FIG. 6 is a sectional view showing a seal ring according to the prior art.

The results of testing the seal rings 20 according to this embodiment of the invention will now be described. In the test, seal rings 20 were made of synthetic resin and of cast iron. The synthetic resin seal rings were obtained by adding carbon fiber to polyether ether ketone (PEEK). The seal rings had an outer diameter of 52φ, a width of 2.3 mm and a thickness of 2.3 mm. The arcuate surface 22 was 20 mm R and the angle of inclination of the tapered faces 21a, 21b was made 5°. The conventional seal ring 5, the sectional shape of which is as shown in FIG. 6, was also fabricated from a material and in basic dimensions identical with those of this embodiment of the invention. Both the conventional seal ring 5 and the seal ring 20 of this embodiment were installed in the device of FIG. 5 and tested with regard to dragging torque and durability.

(Test of dragging torque)

Figure 2:
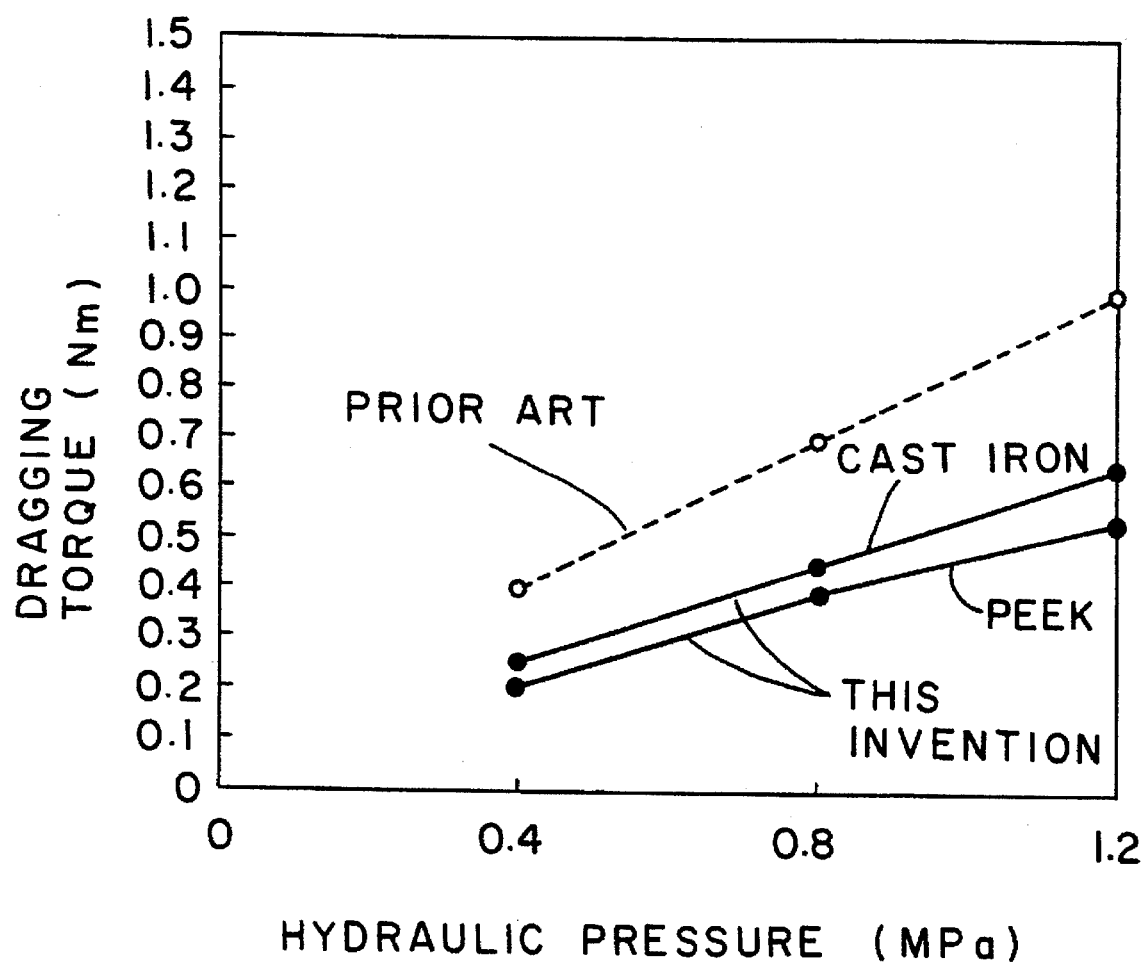
FIG. 2 is a graph showing the relationship between hydraulic pressure and dragging torque in a test of dragging torque.

The results of the test of dragging torque are shown in FIG. 2, in which the conditions were a rotational speed of 2000 rpm for the housing 6, a hydraulic pressure of 0.4 to 1.2 MPa and an oil temperature of 80° C. FIG. 2 shows that the seal ring of this embodiment exhibits a dragging torque which is 30% lower than that of the prior art. This means a lower loss torque, allowing the fuel efficiency of the device 1 to be improved.

(Durability test)

Figure 3:
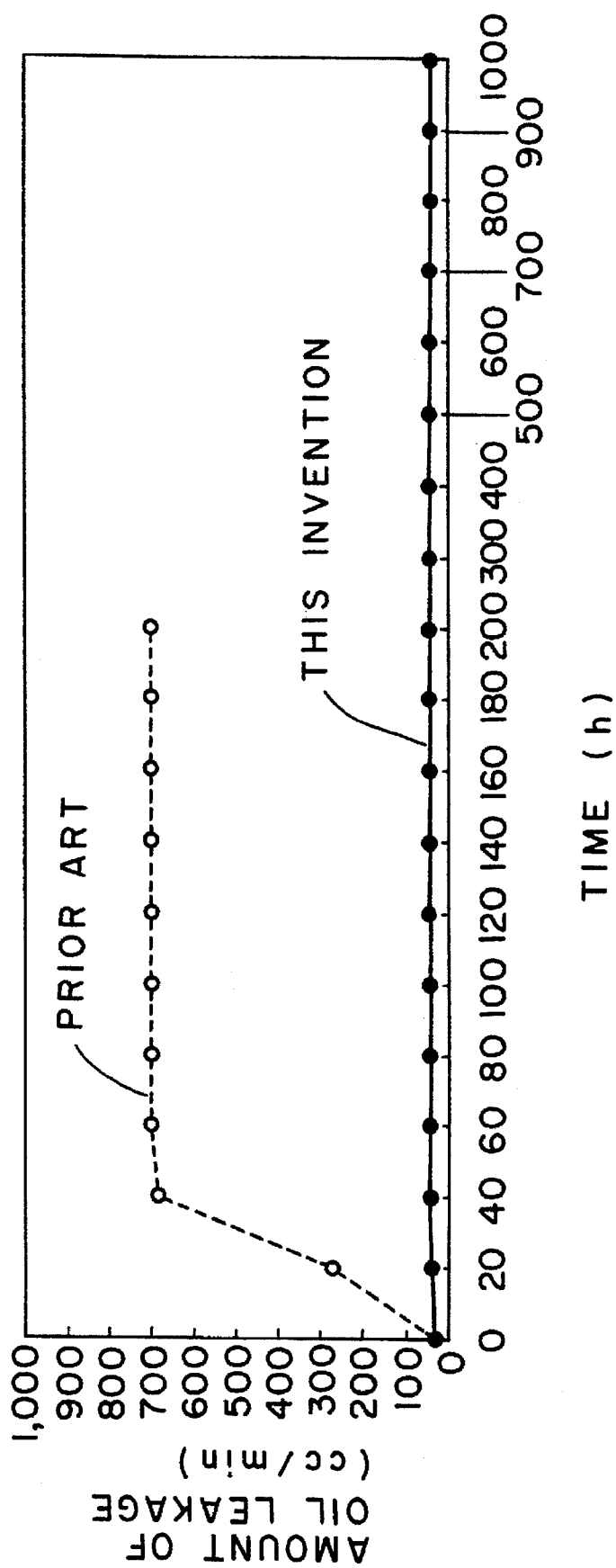
FIG. 3 is a graph showing leakage of oil in a test of durability.

FIG. 3 illustrates amount of oil leakage according to the present invention and the prior art. These are the results of a durability test in which the conditions were a rotational speed of 7000 rpm for the housing 6, a hydraulic pressure of 1.2 MPa and an oil temperature of 120° C. FIG. 3 illustrates that whereas the amount of oil leakage increases sharply after 40 hrs in the case of the prior art, the amount of oil leakage according to the present invention is low and constant even with the passage of time.

Figure 4:
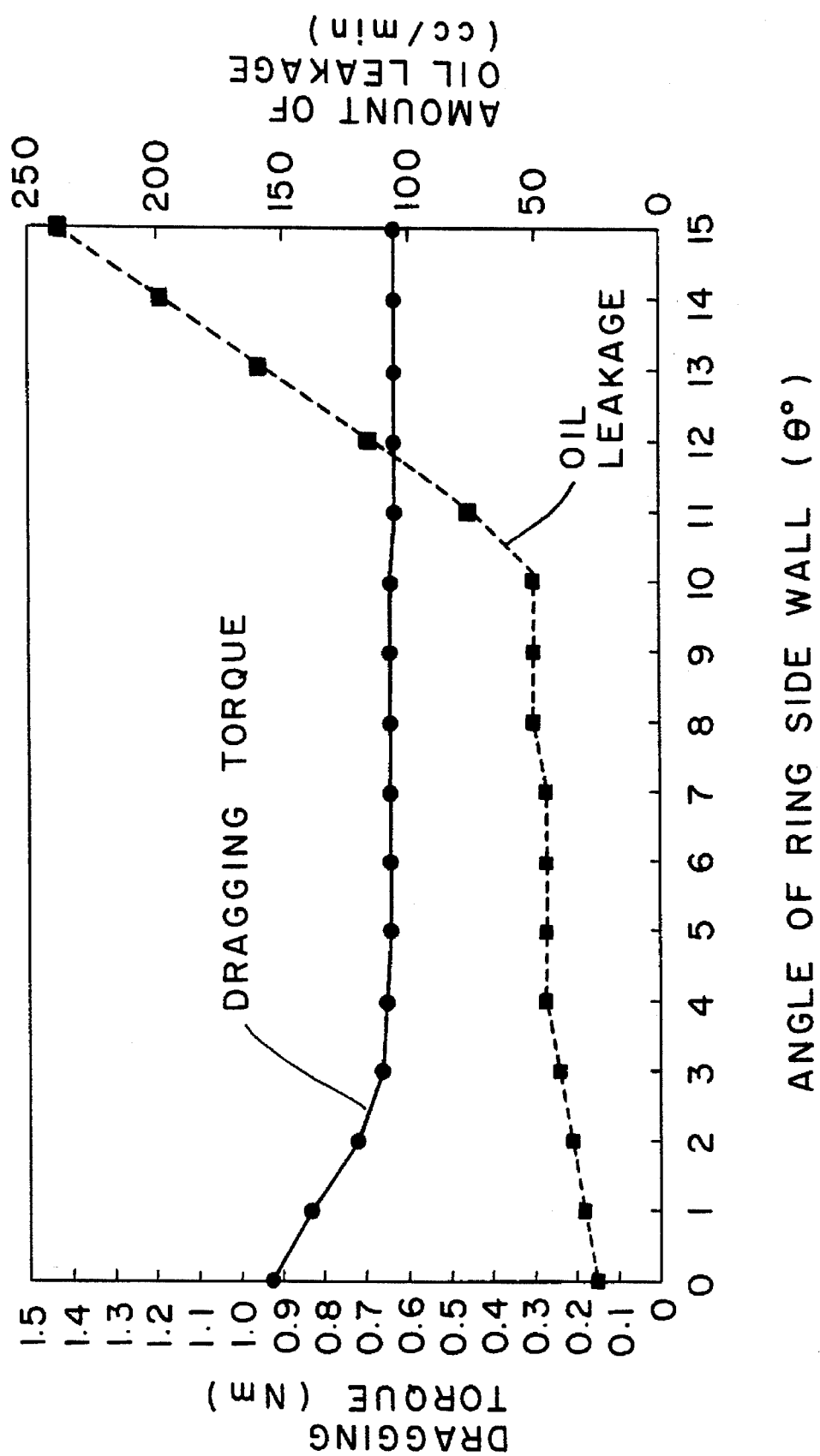
FIG. 4 is a graph showing the relationship between inclination angle of the tapered face of a seal ring, dragging torque and amount of oil leakage.

FIG. 4 illustrates how dragging torque and amount of oil leakage are related to the angle of inclination of the tapered faces 21a, 21b of the seal ring 20. It should be evident from FIG. 4 that the amount of oil leakage increases at an inclination angle above 10° and that dragging torque increases at an inclination of less than 2°.

Though test results are not particularly shown, it was found that the amount of wear of the housing 6 according to the invention is no different from that of the prior art if the radius of curvature of the arcuate surface 22 is made greater than 50 mm R. If the arcuate surface 22 is made less than 2 mm R, surface pressure increases and wear accelerates sharply.

Thus, according to the seal ring of the present invention, the combination of the arcuate surface on the outer circumferential side of the seal ring and the tapered side surface of the seal ring results in balance between the hydraulic pressure that acts upon the side surfaces and the hydraulic pressure that acts upon the inner circumferential surface, thereby reducing dragging torque and minimizing leakage of oil. The seal device using this seal ring exhibits outstanding durability and makes it possible to achieve a constant piston stroke at all times.

As many apparently widely different embodiments of the present invention can be made without departing from the spirit and scope thereof, it is to be understood that the invention is not limited to the specific embodiments thereof except as defined in the appended claims.

What is claimed is:

1. A seal device comprising:

a shaft having an annular groove which is provided in an outer peripheral surface thereof and in which hydraulic pressure is introduced, and ring grooves each having side wall surfaces and communicating with the annular groove and provided on each side of said annular groove;

a housing having an inner peripheral surface and a working chamber which communicates with the annular groove;

seal rings, each being made of synthetic resin and having side surfaces and an outer circumferential surface, arranged in each ring groove in such a manner that said outer circumferential surface comes into sliding contact with the inner peripheral surface of said housing and one of said side surfaces comes into sliding contact with the side wall surface of said ring groove; and a piston reciprocated by being acted upon by hydraulic pressure within the working chamber;

the side surfaces of each said seal ring being tapered such that the width of each seal ring on an inner circumferential side thereof is narrower than the width of the seal ring on an outer circumferential side thereof, the side surfaces being tapered at an angle of 2° to 10°, and said outer circumferential surface having an arcuate cross section.

2. The seal device of claim 1, wherein the side surfaces of each seal ring are tapered at an angle of 3° to 8° and the radius of curvature of the arcuate cross section of the outer circumferential surface is 2 to 50 mm.

3. The seal device of claim 2, wherein the radius of curvature of the arcuate cross section of the outer circumferential surface is 20 to 40 mm.

4. A combination of shaft and seal rings comprising:

a shaft having an annular groove and a pair of ring grooves in an outer peripheral surface thereof, said ring grooves having a rectangular cross section and being disposed on opposite sides of said annular groove; and a pair of seal rings disposed in said ring grooves, each seal ring having side surfaces and inner and outer circumferential surfaces, said side surfaces being tapered such that the width of said inner circumferential surface is narrower than the width of said outer circumferential surface, and said outer circumferential surface having an arcuate cross section.

5. The combination of claim 4, wherein the side surfaces are tapered at an angle of inclination of 2° to 20° and the radius of curvature of the arcuate cross section of the outer circumferential surface is 2 to 50 mm.

6. The combination of claim 5, wherein the side surfaces are tapered at an angle of inclination of 3° to 8° and the radius of curvature of the arcuate cross section of the outer circumferential surface is 20 to 40 mm.

7. The combination of claim 5, wherein the seal rings are made of synthetic resin.

8. The combination of claim 6, wherein the seal rings are made of synthetic resin.

* * * * *